United States Patent
Liu

(10) Patent No.: US 8,411,072 B2
(45) Date of Patent: Apr. 2, 2013

(54) SYSTEM AND METHOD OF SAVING INPUT CONTENT

(75) Inventor: Qing-Hua Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 447 days.

(21) Appl. No.: 12/730,369

(22) Filed: Mar. 24, 2010

(65) Prior Publication Data

US 2011/0157239 A1 Jun. 30, 2011

(30) Foreign Application Priority Data

Dec. 29, 2009 (CN) .......................... 2009 1 0312516

(51) Int. Cl.
*G06F 3/033* (2006.01)

(52) U.S. Cl. .......................... 345/179; 345/901; 345/690
(58) Field of Classification Search .......... 345/690–693, 345/89, 107, 173–183, 901
See application file for complete search history.

(56) References Cited

U.S. PATENT DOCUMENTS

| 7,518,610 B2 * | 4/2009 | Iwata | 345/467 |
| 7,606,421 B2 * | 10/2009 | Poor | 382/186 |
| 8,035,611 B2 * | 10/2011 | Sakamoto | 345/107 |
| 2011/0273490 A1 * | 11/2011 | Shimazaki | 345/690 |

* cited by examiner

*Primary Examiner* — Kevin M Nguyen
*Assistant Examiner* — Sepideh Ghafari
(74) *Attorney, Agent, or Firm* — Altis Law Group, Inc.

(57) ABSTRACT

A method of saving input content on an electronic device is disclosed. A setting module sets M bits grayscale per sampled pixel, M is a whole number. A creating module creates a file to store input content. An obtaining module obtains data of the input content. A storing module stores the data in the file and stores M bits grayscale per sampled pixel.

8 Claims, 3 Drawing Sheets

SYSTEM AND METHOD OF SAVING INPUT CONTENT

BACKGROUND

1. Technical Field

The present disclosure relates to a system and a method of saving input content.

2. Description of Related Art

Electronic devices (such as electronic books) typically allow viewing of electronic pages. A user may be able to make comments on the electronic pages. The comments are saved in the electronic devices. However, all the Red, Green, Blue (RGB) values of the comments (input content) are also stored in the electronic devices. Therefore, it requires a large storage space.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming languages such as Java, C, or Assembly. One or more software instructions in the modules may be embedded in firmware, such as an EPROM. It is noteworthy, that modules may comprise connected logic units, such as gates and flip-flops, and programmable units such as programmable gate arrays or processors. The modules described herein may be implemented as software and/or hardware modules and may be stored in any type of computer-readable medium or other computer storage device.

Figure 1:
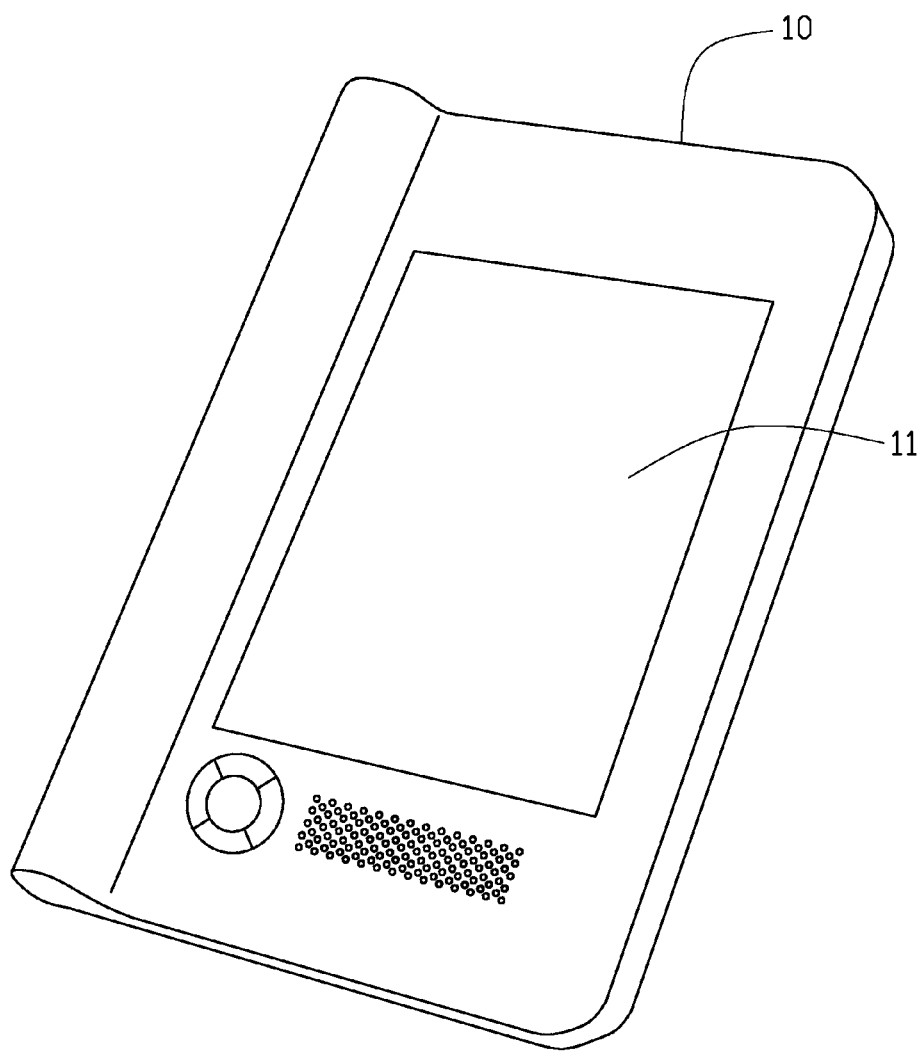
FIG. 1 is a schematic view of an electronic device in accordance with one embodiment.
Figure 2:
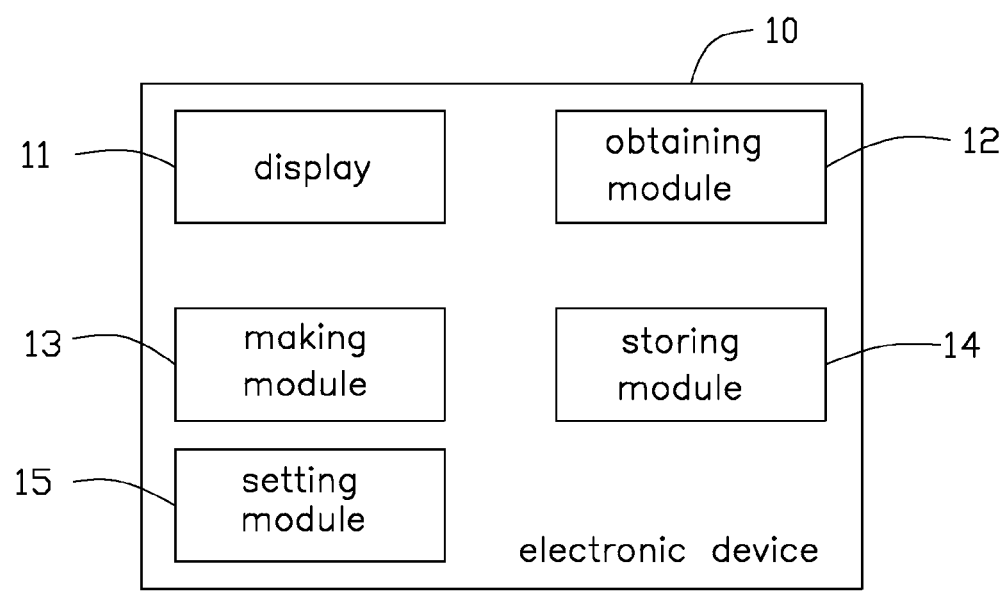
FIG. 2 shows a flowchart of an electronic device in accordance with one embodiment.

Referring to FIGS. 1-2, an electronic device 10 includes a display 11, an obtaining module 12, a creating module 13, a storing module 14, and a setting module 15. The setting module 15 sets M bits grayscale per sampled pixel, and the number M is a whole number. The creating module 13 creates a file to store input content. The obtaining module 12 is capable of obtaining the input content. In one embodiment, the obtaining module 12 obtains the input content by scanning the display 11. The storing module 14 is capable of storing the input content in the file and storing M bits grayscale per sampled pixel. The display 11 for example, is a hand-input display.

Figure 3:
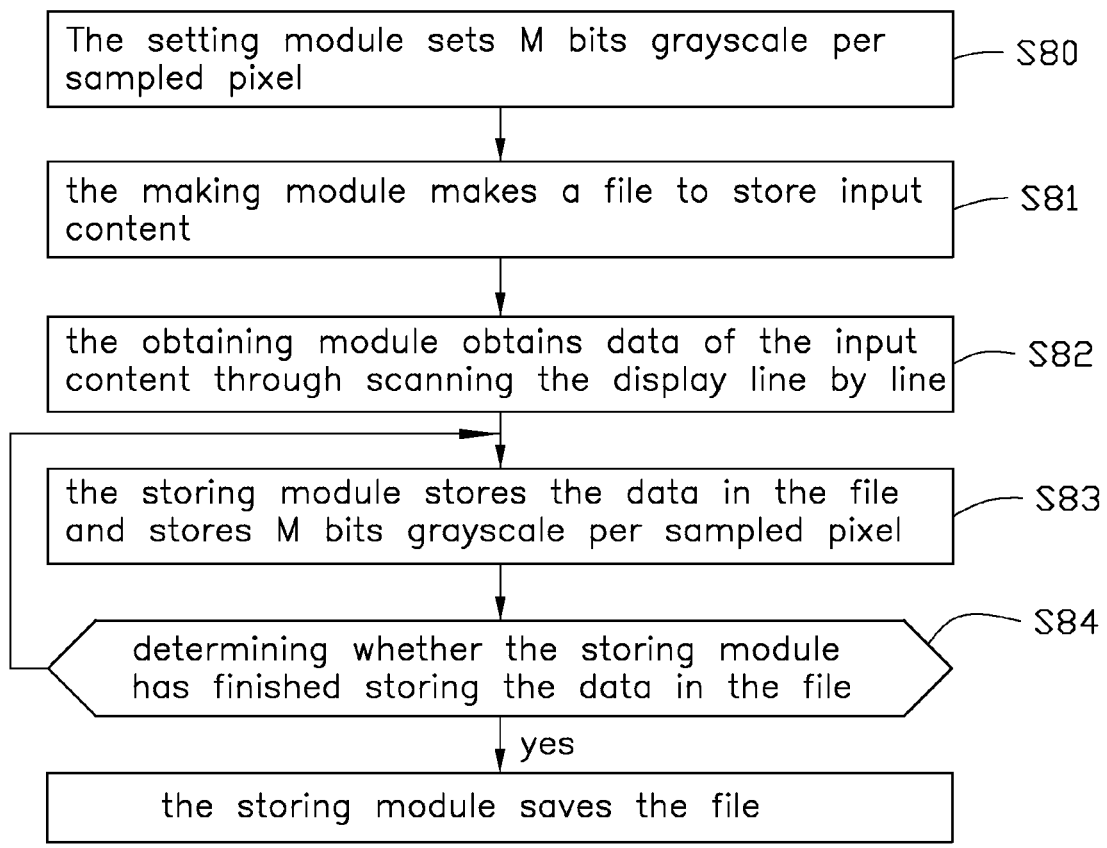
FIG. 3 is a flowchart of an embodiment of a method of saving input content on electronic devices such as that of FIG. 2.

Referring to FIG. 3, one embodiment of a method of saving input content on an electronic device includes the following blocks.

In block S80, a user inputs content on the display 11. The setting module 15 sets M bits grayscale per sampled pixel. In one embodiment, M is four.

In block S81, the creating module 13 creates a file to store input content.

In block S82, the obtaining module 12 obtains data of the input content by scanning the display 11 line by line. In one embodiment, each line has 800 pixels. The display 11 is scanned 800 pixels from left to right.

In block S83, the storing module 14 stores the data of the input content in the file and stores M bits grayscale per sampled pixel. The grayscale data of the pixels, are stored as N bytes, with the same intensity in the electronic device 10, when storing the data in the file, in which N is a whole number. In one embodiment, N is two, wherein one byte is equal to 8 bits. First M bits express grayscale, and then a plurality of bits express a number of pixels with the same intensities. In one embodiment, F12C in hex expresses 300 white pixels. "F" expresses white pixels. "12C" expresses 300 in decimalism. "F12C" occupies two bytes. "F" occupies 4 bits (M bits), in binary "1111" grayscale. 01F4 in hex expresses 500 black pixels. "0" expresses black pixels, in binary "0000" grayscale. "1F4" expresses 500 in decimalism.

Block S84, determines whether the storing module 14 has finished storing the data in the file. If yes, the storing module 14 saves the file. If no, it returns to S83.

While the present disclosure has been illustrated by the description of the embodiments thereof, and while the embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method of saving input content on an electronic device, the method comprising steps in following order:
   firstly, setting M bits grayscale per sampled pixel, wherein M is a whole number;
   secondly, creating a file to store input content;
   thirdly, obtaining data of the input content by scanning a hand-input display line by line; and
   fourthly, storing the data in the file and storing M bits grayscale per sampled pixel.

2. The method of claim 1, wherein the data of the pixels are stored as N bytes with a same intensity when storing the data in the file, wherein N is a whole number.

3. The method of claim 1, wherein M is equal to four.

4. The method of claim 1, wherein the input content is black and white images.

5. An electronic device capable of saving input content, the electronic device comprising:
   a setting module setting M bits grayscale per sampled pixel, wherein M is a whole number;
   a creating module creating a file to store input content;
   an obtaining module obtaining data of the input content by scanning a hand-input display line by line; and
   a storing module storing the data in the file and storing M bits grayscale per sampled pixel.

6. The electronic device of claim 5, wherein the data of the pixels are stored as N bytes with same intensity when storing the data in the file, wherein N is a whole number.

7. The electronic device of claim 5, wherein M is equal to four.

8. The electronic device of claim 5, wherein the input content is black and white images.

* * * * *